(12) United States Patent
Tynkov

(10) Patent No.: US 7,409,301 B2
(45) Date of Patent: Aug. 5, 2008

(54) BOILER WATER LEVEL MONITORING AND CONTROL SYSTEM

(75) Inventor: Boris M. Tynkov, Bayside, WI (US)

(73) Assignee: Cleaver-Brooks, Inc., Milwaukee, WI (US)

(*) Notice: Subject to any disclaimer, the term of this patent is extended or adjusted under 35 U.S.C. 154(b) by 0 days.

(21) Appl. No.: 10/742,008

(22) Filed: Dec. 19, 2003

(65) Prior Publication Data

US 2004/0181349 A1 Sep. 16, 2004

Related U.S. Application Data

(60) Provisional application No. 60/437,196, filed on Dec. 31, 2002.

(51) Int. Cl.
*G01F 17/00* (2006.01)
(52) U.S. Cl. ..................................... 702/55
(58) Field of Classification Search ............. 702/55
See application file for complete search history.

(56) References Cited

U.S. PATENT DOCUMENTS

| | | | | |
|---|---|---|---|---|
| 3,060,717 | A * | 10/1962 | Howe | 73/1.73 |
| 3,610,208 | A | 10/1971 | Penning | |
| 4,383,544 | A | 5/1983 | Vosper | 137/94 |
| 4,445,180 | A * | 4/1984 | Davis et al. | 700/289 |
| 4,465,088 | A | 8/1984 | Vosper | 137/1 |
| 4,619,224 | A | 10/1986 | Takita et al. | 122/451 R |
| 4,662,390 | A | 5/1987 | Hawkins | 137/392 |
| 4,839,590 | A | 6/1989 | Koski et al. | |
| 4,854,121 | A * | 8/1989 | Arii et al. | 60/39.182 |
| 4,864,857 | A | 9/1989 | Koon | |
| 4,941,435 | A * | 7/1990 | Person | 122/382 |
| 5,050,430 | A | 9/1991 | Begin et al. | |
| 5,224,445 | A * | 7/1993 | Gilbert, Sr. | 122/448.1 |
| 5,412,316 | A | 5/1995 | Dumais et al. | |
| 5,535,625 | A | 7/1996 | Levy | |
| 5,756,880 | A * | 5/1998 | Chen et al. | 73/40 |
| 5,791,147 | A * | 8/1998 | Earley et al. | 60/646 |
| 5,794,446 | A * | 8/1998 | Earley et al. | 60/646 |

(Continued)

OTHER PUBLICATIONS

Aqua-Chem, Inc.-Cleaver Brooks, Water Level Control System (Boiler/Burner Products), before Dec. 31, 2001.

(Continued)

*Primary Examiner*—John E Barlow, Jr.
*Assistant Examiner*—Stephen J Cherry
(74) *Attorney, Agent, or Firm*—Whyte Hirschboeck Dudek SC

(57) ABSTRACT

A software-based water level monitoring and control system, preferably for use with conventional steam boilers, is disclosed. The system includes software for monitoring and recording system functions, safety features, diagnostic testing histories, and other functions. The water level system is employed to monitor and/or regulate one or more operating parameters of the boiler, such as water levels within the boiler. In response to the boiler system testing of low-water cut-off, auxillary low-water cut-off, and pressure vessel float operation and functionality, the software builds histories and other data compilations. The extensive electronic information permits a user that accesses the water level control system to, for example, view the data compilations and to monitor the status of the system. In this manner, real-time information, as well as the historical data, are available to accomplish the regulation of key parameters in the boiler.

4 Claims, 22 Drawing Sheets

U.S. PATENT DOCUMENTS

| | | | |
|---|---|---|---|
| 5,817,927 A * | 10/1998 | Chen et al. | 73/40.7 |
| 5,848,549 A | 12/1998 | Nyce et al. | |
| 6,073,591 A | 6/2000 | Theriault | |
| 6,109,096 A * | 8/2000 | Chen et al. | 73/40 |
| 6,244,098 B1 * | 6/2001 | Chen et al. | 73/40 |
| 6,520,122 B2 * | 2/2003 | Kemp et al. | 122/504.2 |
| 6,650,128 B2 | 11/2003 | Sanders | 324/715 |
| 2002/0108440 A1 | 8/2002 | Colman et al. | |

OTHER PUBLICATIONS

Carremm Controls Limited, Level Pro, date unknown.
Siemens, Compact Universal Controllers, Mar. 28, 2000.
National Board News, Why Boilers Fail, Jul. 26, 2002.

* cited by examiner

| COMMAND | DESCRIPTION |
|---|---|
| PASS | ENTER A PASSWORD<br>a) OPERATOR PASSWORD (LEVEL 1)<br>b) MAINTENANCE PASSWORD (LEVEL 2)<br>c) TEMPORARY PASSWORD (GIVEN BY CLEAVER BROOKS TECHNICIAN TO OPERATOR OR CB REPRESENTATIVE DURING FIELD DEBUGGING). THIS PASSWORD ONLY WORKS WHILE POWER IS APPLIED TO THE CONTROLLER, AND IS ONLY VALID FOR 2 HOURS. |
| ALARM | VIEW CURRENT VALUE ALARM /WARNING COUNTDOWN TIME, IN SECONDS |
| ALWCOBELOW | VIEW CURRENT VALUE MAXIMUM TIME WATER LEVEL CAN REMAIN BELOW LWCO DURING ALWCO TEST, IN SECONDS |
| ALWCOTOTAL | VIEW CURRENT VALUE MAXIMUM TIME FOR ALWCO TEST, IN SECONDS |
| BDMIN | VIEW CURRENT VALUE MINIMUM TIME WATER LEVEL MUST REMAIN BELOW LWCO DURING TEST, IN SECONDS |
| BDNOTIFY | VIEW CURRENT VALUE TIME AFTER PREVIOUS BLOWDOWN BEFORE OPERATOR IS NOTIFIED A NEW BLOWDOWN IS REQUIRED, IN HOURS (4-24 HOURS) |
| BDTOTAL | VIEW CURRENT VALUE MAXIMUM TIME FOR BLOWDOWN TEST, IN SECONDS |
| BDWAIT | VIEW CURRENT VALUE MINIMUM TIME REQUIRED BETWEEN SUCCESSIVE BLOWDOWNS, IN MINUTES |
| DATE | SET OR VIEW DATE |
| DISPALARMS | VIEW CURRENT VALUE SHOWS ALL ALARMS IN HISTORY SHOWS THE 'X' NEWEST ALARMS IN HISTORY |
| DISPLAY | VIEW CURRENT VALUE SET ON /OFF (0) OR MODULATING (1) CONTROL |
| LVLZERO | WATER LEVEL 4mA POINT, IN INCHES (I.E., WATER LEVEL ABOVE LWCO FOR 4mA POINT) |
| LVLSPAN | WATER LEVEL 20mA POINT, IN INCHES (I.E., WATER LEVEL ABOVE LWCO FOR 20mA POINT) |

FIG. 21A

| COMMAND | DESCRIPTION |
|---|---|
| RESETALARM | RESET RECENT ALARM HISTORY (LAST 20 ALARMS) |
| RESETALWCO | RESET ALWCO HISTORY (LAST 5 ALWCO'S) |
| RESETBD | RESET BLOWDOWN HISTORY (LAST 5 BLOWDOWNS) |
| SETTABLE | VIEW CURRENT TABLE VALUES<br># IS TABLE # (1-9)<br>n IS PARAMETER IN TABLE:<br>0 = NWL<br>1 = SENSITIVITY<br>2 = WATER VALVE OPEN<br>3 = WATER VALVE CLOSED<br>4 = HIGH ALARM<br>5 = HIGH WARNING<br>6 = LOW WARNING<br>VALUE IS THE 4 DIGIT ENTERED VALUE,<br>I.E., 1125 IS 1.125"<br><br>EXAMPLE:<br>SETTABLE, 3,5,4750 SETS THE HIGH<br>WATER WARNING VALUE TO 4.750" |
| STAT | DISPLAY STATUS OF ALARMS AND WARNINGS. SEE DESCRIPTION AT END OF THIS TABLE. |
| TEMP | ENTER:<br>  TEMP[CR]<br>RETURNS:<br>TEMP = XX YY<br>DISPLAY CONTROLLER AND SENSOR TEMPERATURE IN THE FORM: XX YY<br>XX = CONTROLLER TEMP (IN DEG C)<br>YY = SENSOR TEMP (IN DEG C) |
| TIME | SET OR VIEW TIME |
| USETABLE | VIEW CURRENT TABLE USED AND CHANGE TO A NEW TABLE. SELECT WATER SENSITIVITY TABLE 1 TO 9 |
| VALVELIMIT | VIEW OR CHANGE THE VALVE VELOCITY LIMITER FROM 0 TO 30 SECONDS. 0 IS DISABLED |

FIG. 21B

| COMMAND | DESCRIPTION |
|---|---|
| VALVEPOINT | LISTS THE 11 POINT VALVE POINT TABLE SETS ANY OF THE 11 POINTS IN THE VALVE POINT TABLE |
| VER | DISPLAY VERSION INFORMATION |
| CNTRALGR | VIEW OR SET THE CONTROL ALGORITHM USED |
| PB | VIEW OR SET THE PROPORTIONAL BAND, FROM FROM 2-999 |
| TI | VIEW OR SET THE TIME INTEGRAL, FROM 0-9999 |

BOILER WATER LEVEL MONITORING AND CONTROL SYSTEM

CROSS-REFERENCE TO RELATED APPLICATIONS

This application claims the benefit of U.S. Provisional Application Ser. No. 60/437,196 filed on Dec. 31, 2002, the teachings and disclosures of which are incorporated herein by reference.

BACKGROUND OF THE INVENTION

The invention relates generally to water level monitoring and control systems. In particular, the invention relates to a software-based water level monitoring and control system used with conventional steam boilers that sets-up, monitors and records system functions, safety features, diagnostic testing histories and other functions.

In traditional steam boiler systems, it is critical to maintain a sufficient level of water within the main boiler to, among other things, sustain proper boiler metal operating temperatures. The loss of a significant amount of water from the system can result in the catastrophic failure of the boiler. The super temperatures reached by the boilers with little or no water may cause damage and dangerous operating conditions.

In an attempt to monitor the level of the water in the boiler, it is common to use a float or other similar device that rises and falls with the actual level of the surface of the water inside the boiler. In such applications, the lowering of the float below a predefined level will cause a safety condition known as a low-water cutoff or (LWCO). In response to such a condition, the system is shut-down prior to even more dangerous conditions being created due to exceedingly low water levels within the boiler.

Because of the importance of knowing what will happen as a result of variations in the boiler water level, testing of the safety procedures of the system occurs frequently, often including testing of redundant back-up systems. Indeed, testing of such parameters as low-water cutoff levels, auxiliary low-water cutoff levels and blowdown times is routinely conducted in most boiler systems. Still, there is an ever-present need to provide reliable systems for setting, maintaining and recording the results of the tests of the boiler water levels and the fail-safe responses to a particularly low water level.

Also, there is a need for real-time information gathering and display, as well as historical data or histories to accomplish the regulation of these key parameters in the boiler Moreover, it would be beneficial to be able to access such information in a computerized environment.

Therefore, it would be advantageous to have a system that creates software-based data histories and other test data compilations to permit a user that accesses the water level control system to view the test data compilations, as well as to monitor the system's status.

SUMMARY

The present invention provides the benefits and advantages heretofore outlined, providing a novel system for monitoring water levels. In one aspect, a computer implemented water level control system for use with a steam boiler is disclosed herein, the system comprising: a level sensor assembly comprising a pressure vessel defining an interior chamber and having a probe with a level sensor positioned in sliding engagement therealong and located within the interior chamber, the probe for measuring a water level in a steam boiler; a controller in communication with the level sensor to obtain level sensor information from the level sensor assembly, to transmit system operating information, and to relay test result information; and a computer having a program stored in a memory, the program readable by the computer to permit the computer to access the controller and to display at least one of water level and historical information to a user. The system operating information and test result information includes at least one of historical boiler water level information and operation or safety information. The at least one of historical boiler water level information and operation or safety information are utilized in at least one of setting, maintaining, recording and testing boiler water levels.

These and other important features, hallmarks and objects of the present invention will be apparent from the following descriptions of an embodiment of the invention which follow.

BRIEF DESCRIPTION OF THE DRAWINGS

The various features, objects and advantages of this invention are best understood with reference to the preferred embodiments when read in conjunction with the following drawings. In addition, the drawings illustrate the best mode presently contemplated for carrying out the invention.

FIGS. 21A-C are charts illustrating exemplary operator status commands and associated descriptions as part of an operator inquiry in accordance with one aspect of the invention.

DETAILED DESCRIPTION

Figure 1:
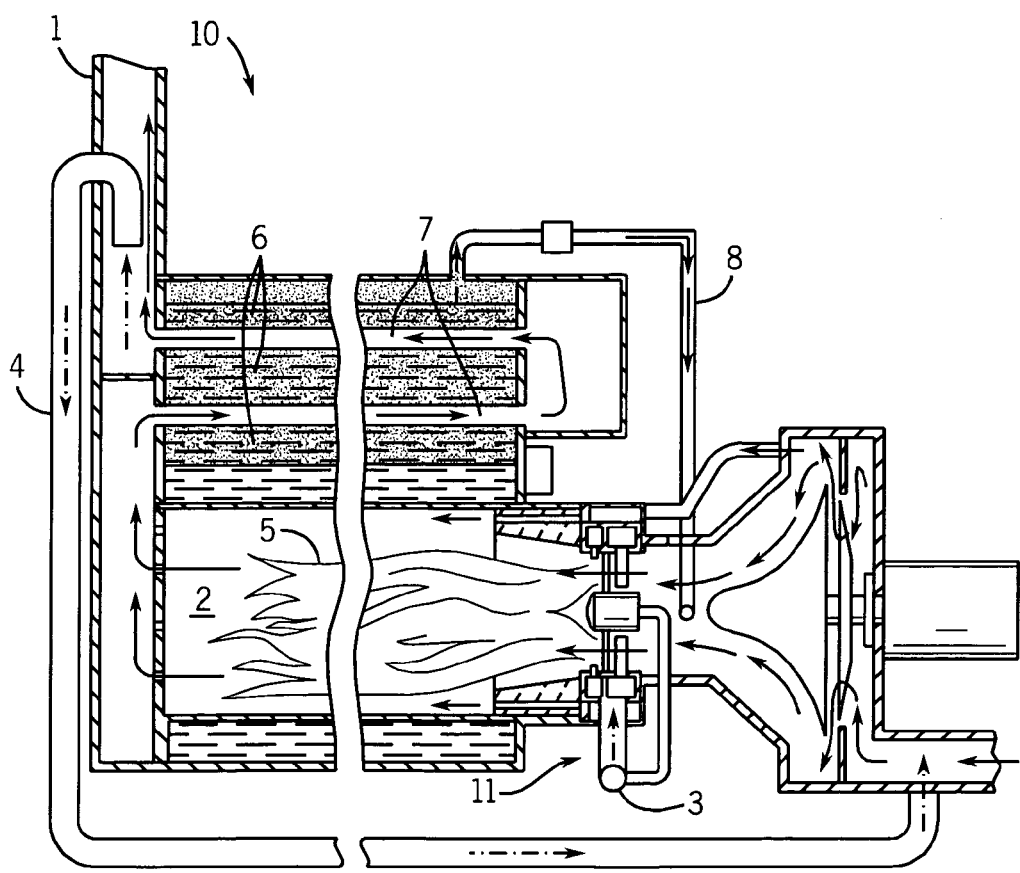
FIG. 1 is a schematic side sectional view of a boiler system that can be used with the boiler water level monitoring and control system of the present invention.

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. Like reference numerals are used to indicate like components.

FIG. 1 is a side sectional view of a steam boiler system used with the present invention. Steam boiler 10 shown is a steam boiler and may be of either a watertube or firetube boiler. More specifically, FIG. 1 illustrates a boiler 10 and burner system 111 for use with the present invention. It is noted that the particular type or shape of boiler is not critical to the present invention, and that numerous conventional devices commonly employed with regular or packaged boilers are not shown (or at least not shown in intricate detail) so that the features of the present invention can be better and more clearly appreciated. The boiler 10 includes an exhaust stack 1 that extends from combustion chamber 2 to discharge combustion product from the boiler. Burner 3 can receive a fuel from a fuel source (not shown) to provide various fuels, such as, for example, propane and natural gas (typically in gaseous rather than liquid form), to power the burner. The burner is connected to combustion chamber 2. Recirculation tube 4 recovers combustion product (i.e., exhaust) such as flue gas (e.g., in the form of a moist heat) via a pick up line 5 connected to exhaust stack 1. Some of the combustion product can then be returned to burner 3 via recirculation tube 4. Combustion chamber 2 provides an area for flame 5 to heat, for instance, a chamber 6 utilized for containing a liquid, such as water, using a plurality of fire tube pipes 7. Boiler 10 can also include a steam injection system having steam pipe 1 for reintroducing steam from the boiler to the burner. Monitoring the water level within the chamber 6 is critical to the operation of the boiler 10. Should the water level fall below, for example, one or more of the fire tube pipes 7, serious damage to or failure of the overall system could result.

Figure 2:
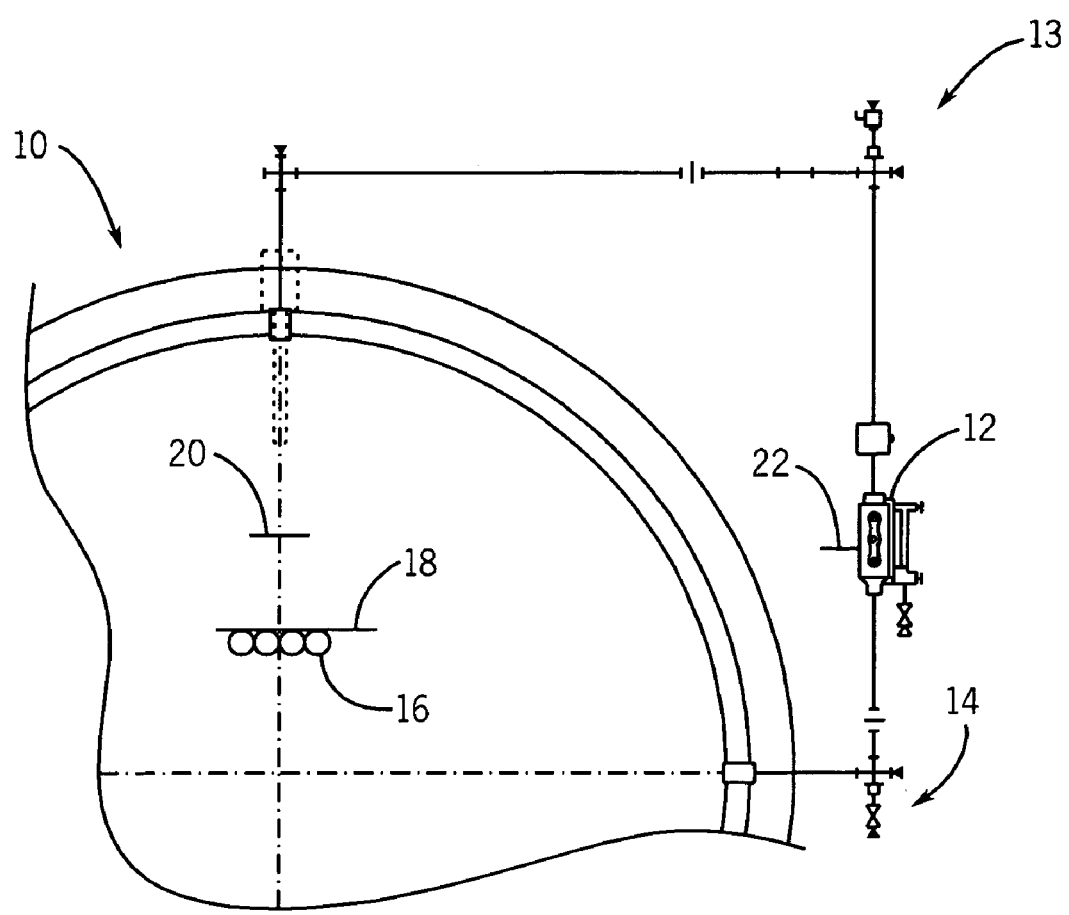
FIG. 2 is a partial schematic view of a water level monitoring and control system used with the boiler system of FIG. 1.

FIG. 2 is a partial schematic of a water level sensor 12, also called a level sensor assembly, used with steam boiler 10. Water level sensor 12 is connected to boiler 10 by a pipe assembly (generally 13) and including blowdown valve 14. Boiler 10 includes, in a known manner, tubes 16, which heat the water in the boiler. The top row of tubes defines line 18 under which water must always be present. To that end, and in further of the safety purpose for maintaining adequate water levels, a low water cutoff (LWCO) level 20 is defined at a location above the top line 18, defined tubes 16. The low water cutoff (LWCO) level 20 is that level at which, if the water level falls below, alarms will sound and safety precautions will be initiated. Water level sensor 12 is mounted such that a desired water level 22 corresponds to the LWCO level 20. This desired water level 22 may be made into a casting mark (26 of FIG. 3) and cast into the actual water level sensor 12 during production. Water level sensor 12 includes both a means for measuring a physical parameter of the steam boiler and a means for at least one of setting, maintaining and recording results of testing of the measuring means.

Figure 3:
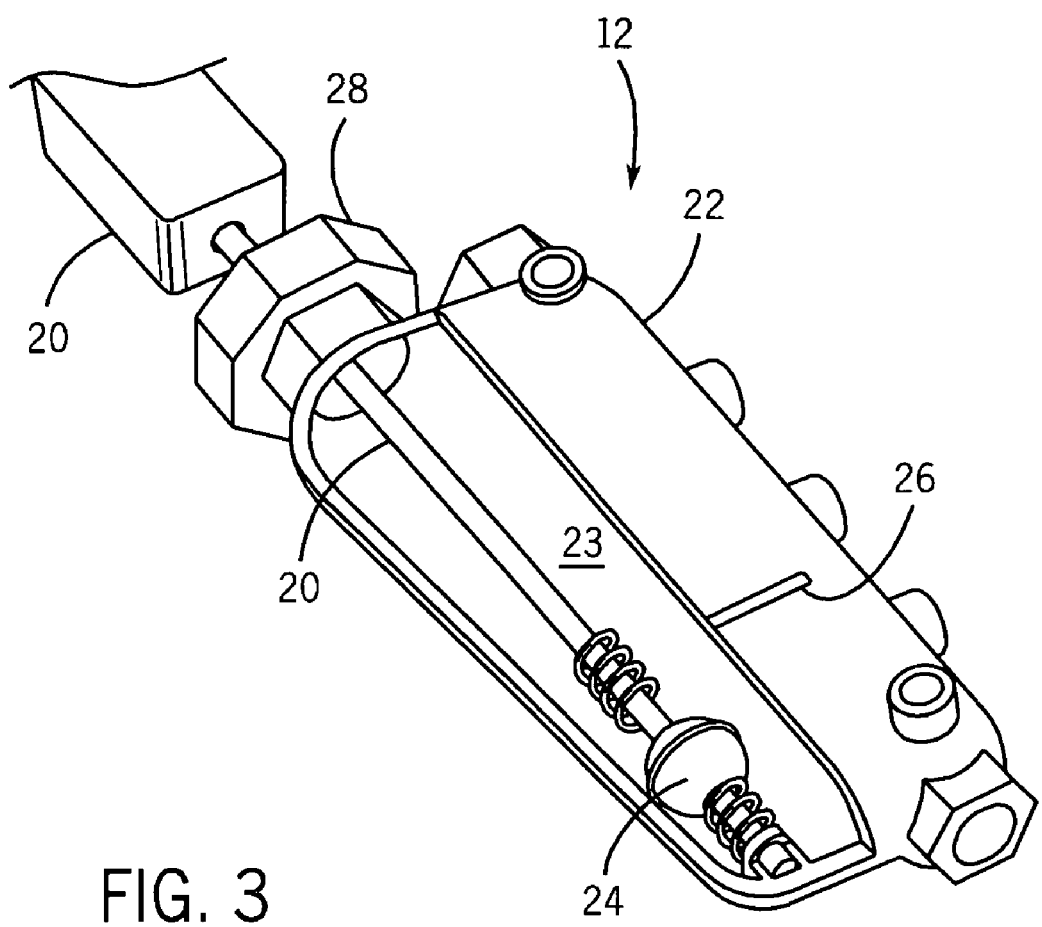
FIG. 3 is a perspective view of a level sensor and pressure vessel of the water level monitoring system showing interior detail in accordance with one aspect of the invention.

FIG. 3 is a perspective view of level sensor assembly 12 (or simply level sensor), with a portion of the cover removed for ease of understanding. Level sensor 12 includes a level sensor probe 20 within a pressure chamber (or water column) 22, the probe 20 for measuring a water level in the boiler. Probe 20 employs a magnetostrictive principle, that is, deformation of a ferromagnetic material subjected to a magnetic field, thereby extending the life of the mechanical components in the probe 20 due to its non-contact and non-wearing nature under the magnetostrictive principle. The magnetic field is supplied by float 24 that includes a captive magnet. The float 24 is preferably made of a titanium material. Level sensor 12 can include, a low watermark 26 that may be cast into the preferably cast steel material of pressure chamber 22. Low water mark 26 may be aligned with the water level of boiler 10 (of FIG. 1) such that the proper alignment of water levels is achieved for calibration and measurement. Fitting 28 helps to assure proper sealing of probe 20. Pressure vessel or chamber 22 defines an interior chamber 23, and the level sensor 12 assembly connected to the pressure chamber 22 has probe 20 with the level sensor 12 positioned in sliding engagement therealong and located within the interior chamber 23.

Figure 4:
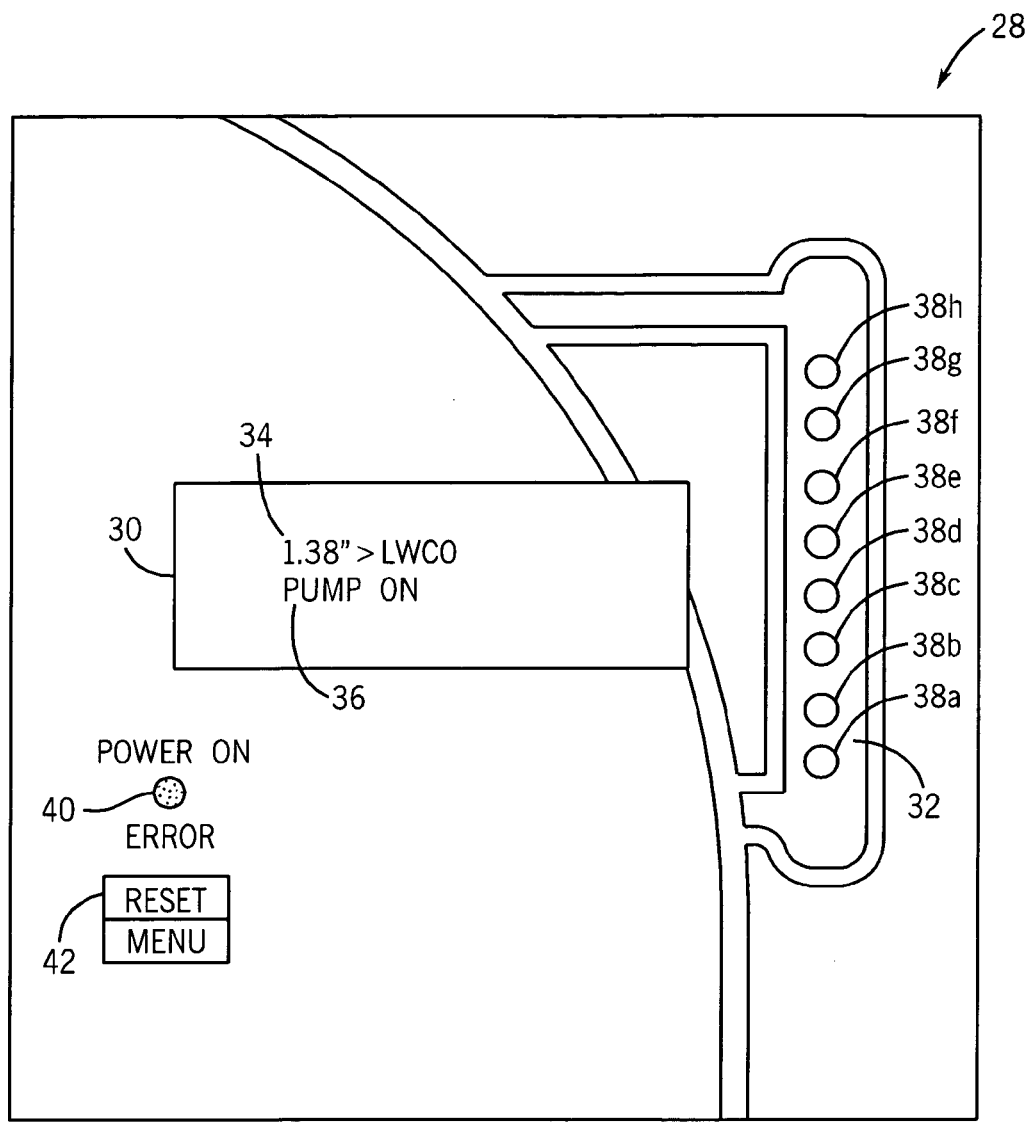
FIG. 4 is a diagram of a boiler controller data display and level indicator illustrating boiler water level and status information in accordance with one aspect of the invention.

FIG. 4 is a diagram of a boiler controller 28 that includes a data display 30 and a level indicator 32. Controller 28 provides the electronics and memory for processing and storing of the information recorded as well as current conditions of the boiler water levels and related information. Controller 28 also provides the input/output capabilities necessary to input and retrieve data regarding the water level system as well as any diagnostic information which may be available. Controller 28 may also receive additional programming and commands in order to change operational parameters or to facilitate diagnostic retrieval. Data display 30 and level indicator 32 are used to illustrate boiler water level and status information. For example, data display 30 may include a display message 34 indicating the boiler water level (e.g. in inches) above a low water cutoff level as well as a display message 36 as to whether a water pump is on or off. In one embodiment, data display 30 and level indicator 32 may be part of a front panel of controller 28, where data display 30 is a 2×16 backlit character LCD display and level indicator 32 has 8 positional LED indicators 38a-h, which correspond to a higher water level as the indicators 38a-h are lit from the bottom. To aid in determining the current risk associated with a current water level, for example, indicators 38a-h may be divided into 3 color sets, where red=dangerous, yellow=caution, and green=normal. A power indicator and error indicator 40, membrane combination reset/menu button 42 provides additional functionality. Controller 28 is primarily an information and safety device, and the primary features include: Low water cutoff (LWCO) and alarm, level indication, high water alarm, low and high water warnings, on/off or modulating control, continuous dynamic probe monitoring, auto or manual reset, real time clock and alarm annunciation, setting of normal water level, user selectable pre-configured water level settings, float non-movement detection and alarm, high water alarm function, water column blowdown routine, real-time stamped event logging for all blowdown cycles and alarm occurrences, auxiliary LWCO check routines providing an independent system in the event of a microprocessor failure, providing internal redundant LWCO relays with current monitoring, contacts for external alarms for LWCO violations and providing non-volatile memory for all logged events. Other configurations and information available on controller 28 are possible and contemplated to be within the scope of the invention.

Figure 5:
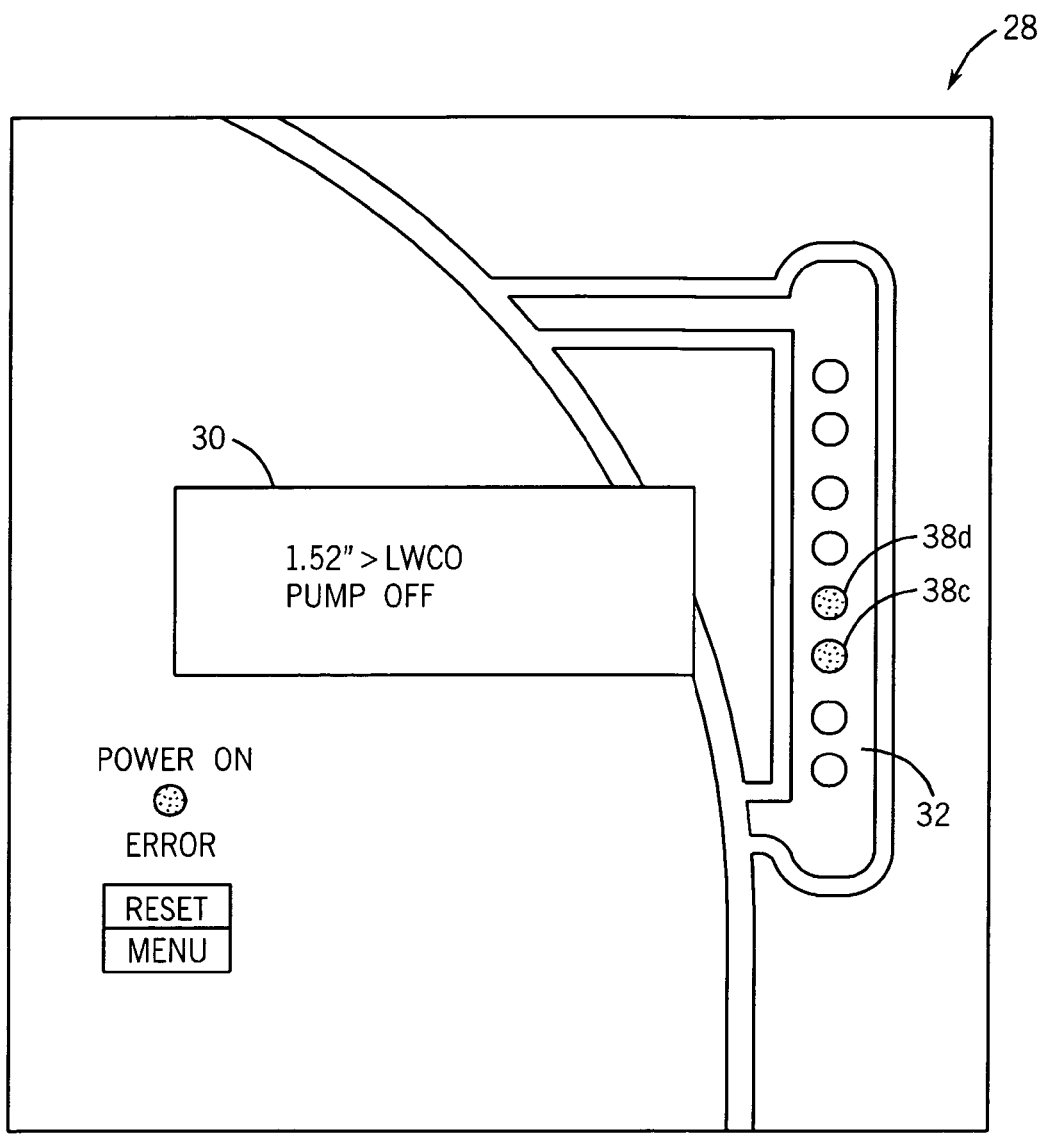
FIG. 5 is a diagram of a boiler controller data display and level indicator illustrating a variation in normal water level in accordance with one aspect of the invention.

FIG. 5 is a diagram of the boiler controller data display 30 and level indicator 32 of controller 28 illustrating a variation in normal water level. As the water level varies, the height of the water above LWCO point will be displayed. In the example shown, a boiler water level of 1.52 inches above the LWCO point (an acceptable variation) is monitored. Since this would be considered a normal water level, the condition would correspond to positional LED indicators 38c and d being lit in a normal (or green) color. The pump is shown to be currently off.

Figure 6:
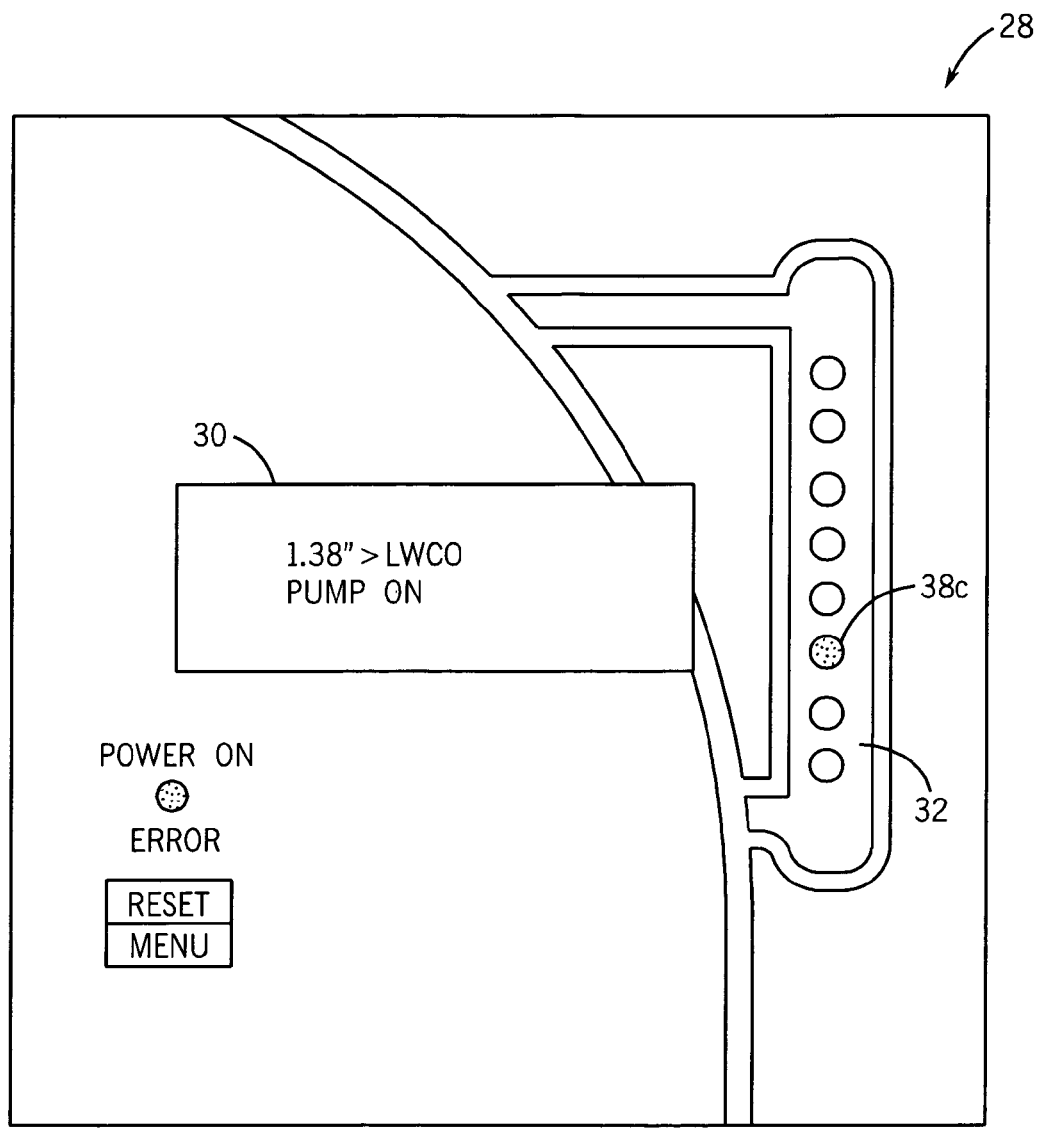
FIG. 6 is a diagram of a boiler controller data display and level indicator illustrating feedwater pump turn-on when water level drops to a predetermined level in accordance with one aspect of the invention.

FIG. 6 is a diagram of the boiler controller data display 30 and level indicator 32 of controller 28. When water level drops to a predetermined level, the feedwater pump will start in order to increase the level of water in the boiler. In this case, a drop in normal water level to a level of 1.38 inches above the LWCO point triggers feedwater pump turn-on. The water level is still within the normal range, as indicated by positional LED indicator 38c being lit in a normal operating range color, such as green, but it is low enough to trigger the preset minimum water level that initiates the feedwater pump. The message in the boiler controller data display 30 indicates that the pump is now turned on.

Figure 7:
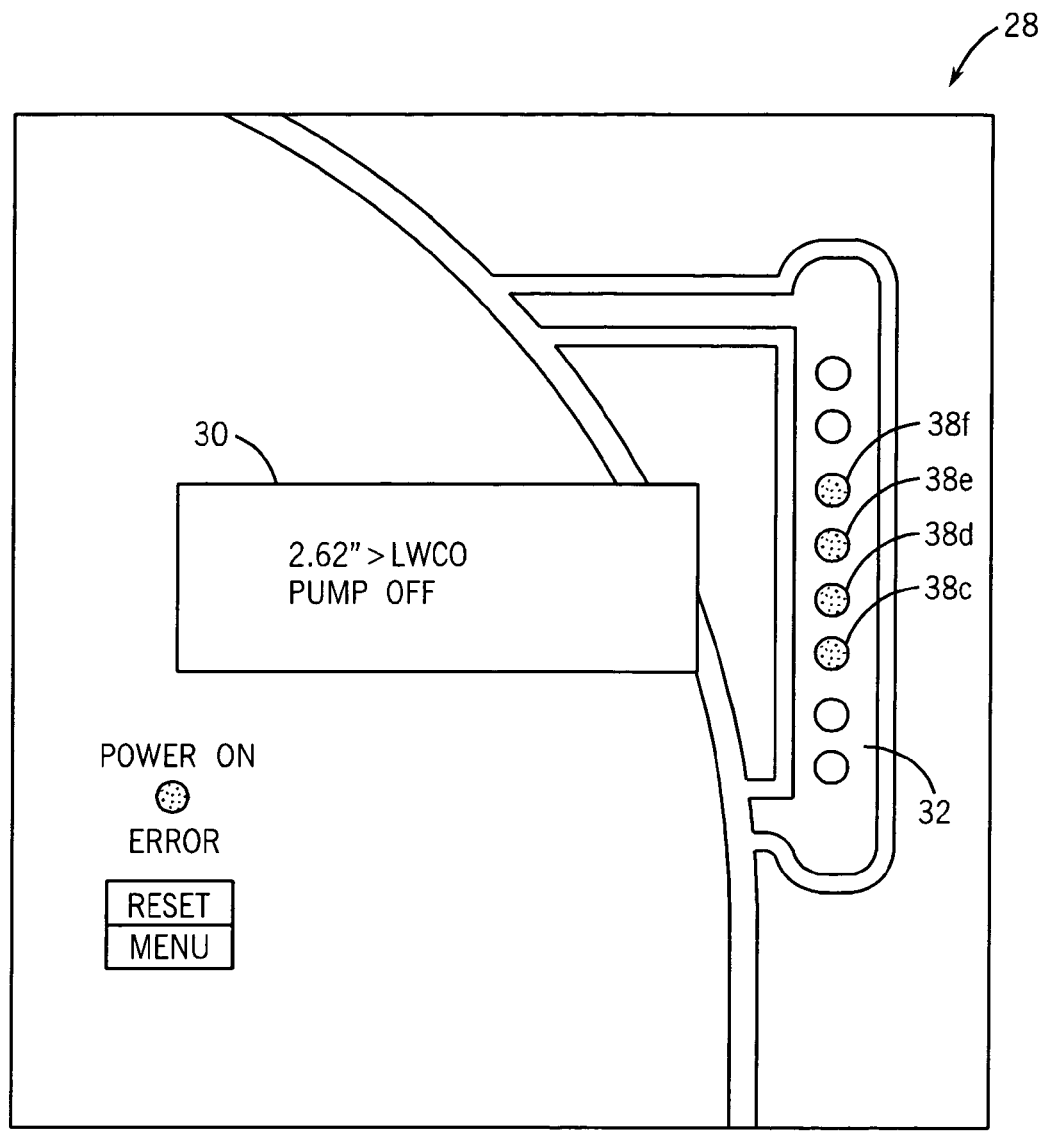
FIG. 7 is a diagram of a boiler controller data display and level indicator illustrating feedwater pump turn-off when water level rises to a predetermined level in accordance with one aspect of the invention.

FIG. 7 is a diagram of a boiler controller data display 30 and level indicator 32 of controller 28. Following the pump turn-on of FIG. 6, after the water level rises to a predetermined level, the feedwater pump is turned off. In the example shown, boiler controller data display 30 indicates that the water level is at 2.62 inches above the LWCO point, which is the predetermined level for pump turn off in this scenario. This level is still a normal operating range, as indicated by the lighting of positional LED indicators 38c-f in level indicator 32 with a normal operating range color, such as green. The message in the boiler controller data display 30 indicates that the pump is now turned off. The difference between the pump turn on level and the pump turn off level is called the span. In the example shown the span would be 2.62-1.38 or 1.26 inches. The settings for normal water level (NWL), the pump turn-on level, the pump turn-off level and the span all relate to the sensitivity level for the controller 28. This sensitivity level can be adjusted as necessary for specific operation or for a given set of design parameters. The water level control system is operational in response to the particular set of sensitivity levels.

Figure 8:
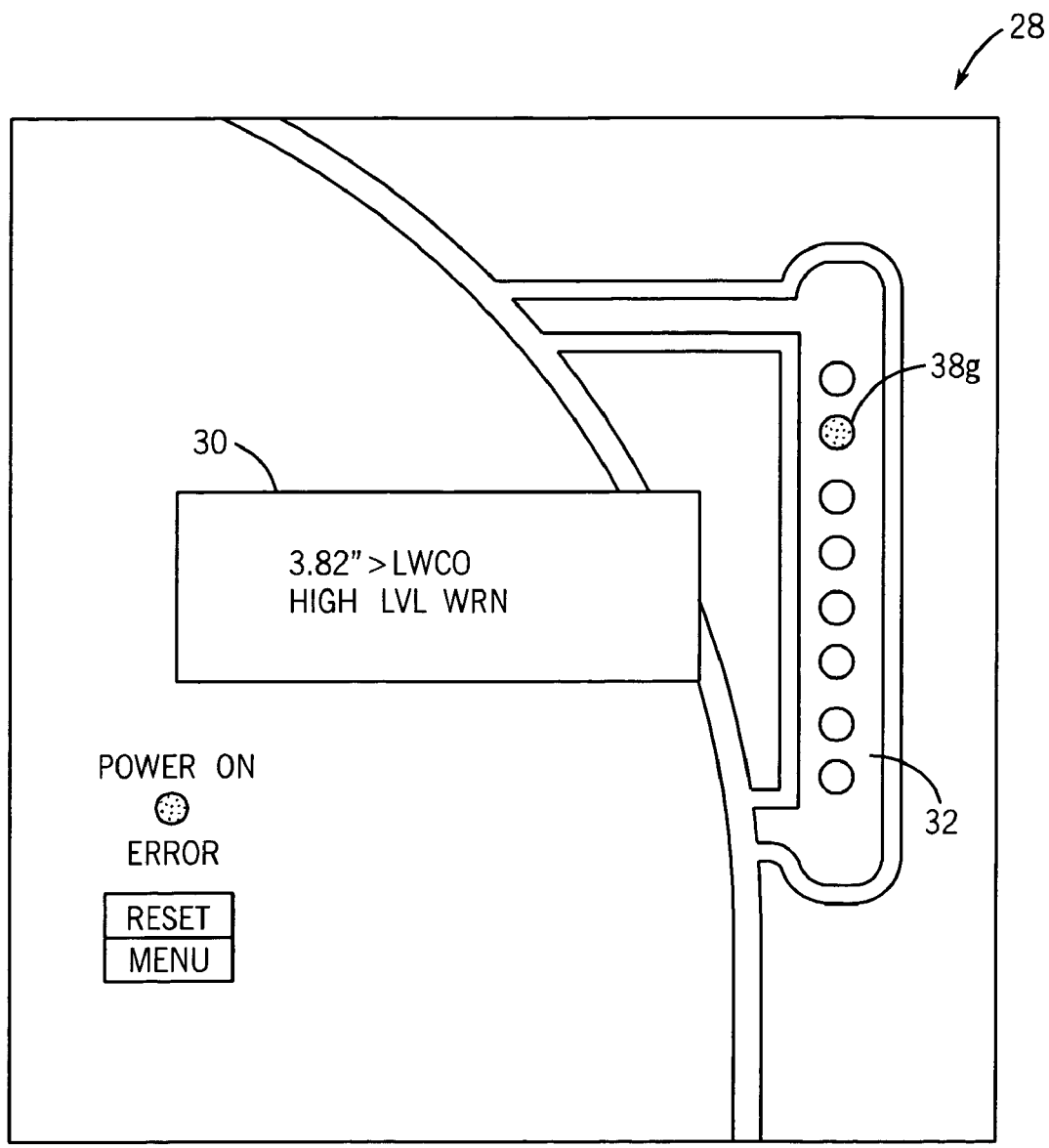
FIG. 8 is a diagram of a boiler controller data display and level indicator illustrating a high water warning in accordance with one aspect of the invention.

FIG. 8 is a diagram of a boiler controller data display 30 and level indicator 32 of controller 28 illustrating a high water warning. In this circumstance, if the water flow to the boiler is not interrupted, and the water level continues to rise, a high level warning will be indicated. In the example shown, boiler controller data display 30 indicates a water level of 3.82 inches above the LWCO point, which is the predetermined level for the high level warning in this scenario. The message in the boiler controller data display 30 indicates a "HIGH LVL WARNING" accompanied by a high water warning indicating light. The high water warning is evidenced by the lighting of positional LED indicator 38g in level indicator 32 with a warning color, such as yellow.

Figure 9:
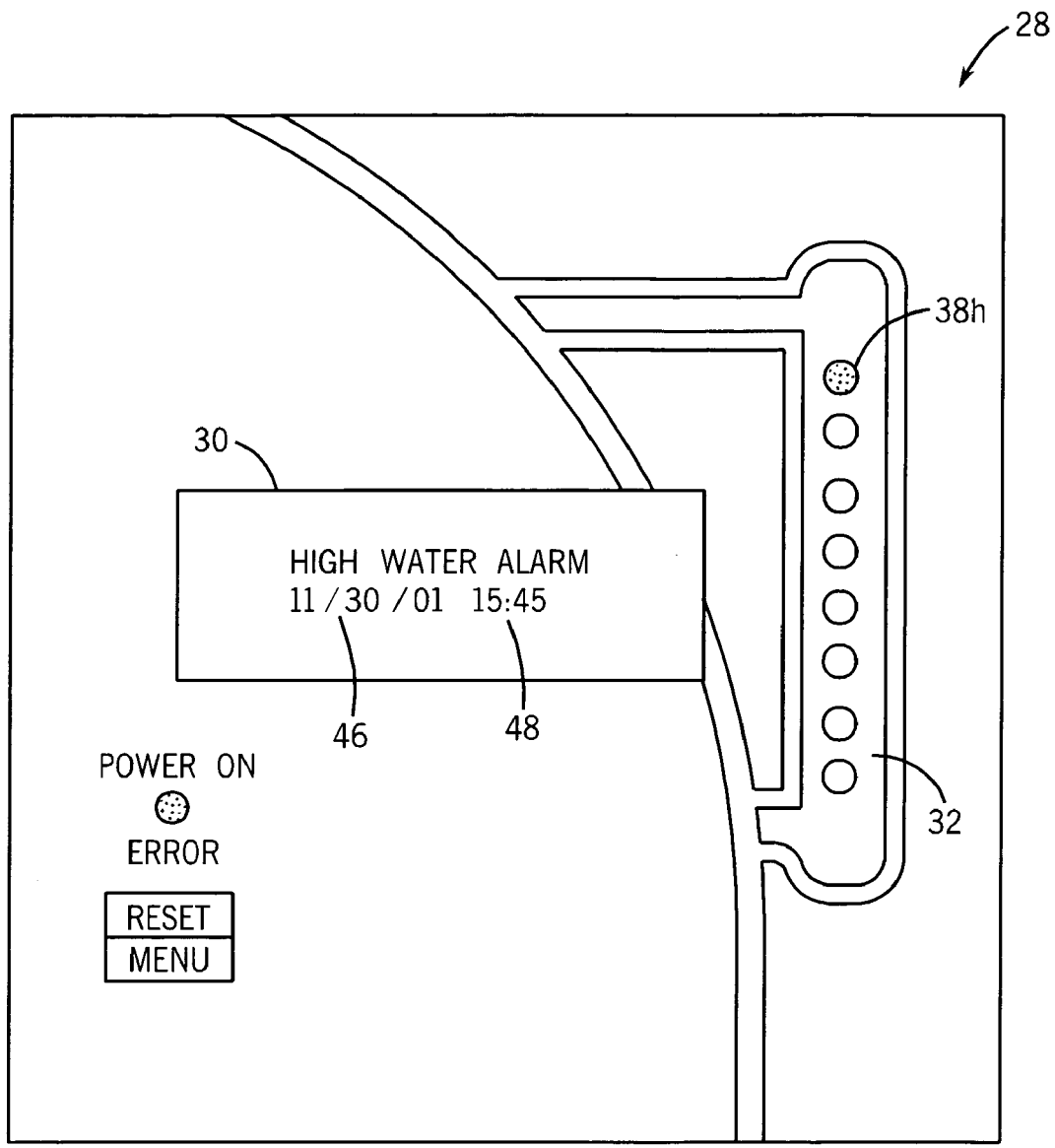
FIG. 9 is a diagram of a boiler controller data display and level indicator illustrating a high water alarm in one aspect of the invention.

FIG. 9 is a diagram of a boiler controller data display 30 and level indicator 32 of controller 28 illustrating a high water alarm. If after the high water warning of FIG. 8 no corrective action is taken, an alarm may sound after a specified amount of time (such as, for example, for a period of five seconds). In this circumstance, if the water flow to the boiler is not interrupted, a high level alarm will be indicated. In the example shown, boiler controller data display 30 indicates "HIGH WATER ALARM." The message in the boiler controller data display 30 also indicates the time 46 and date 48 of the high water alarm, and this information is logged into controller 28. The high water alarm is accompanied by the lighting of positional LED indicator 38h in level indicator 32 with an alarm color, such as red. An alarm will sound so that corrective action may be taken. In general, the controller 28 will enter a high water alarm countdown period and then after that time period expires, the controller will enter a high water warning alarm condition.

Figure 10:
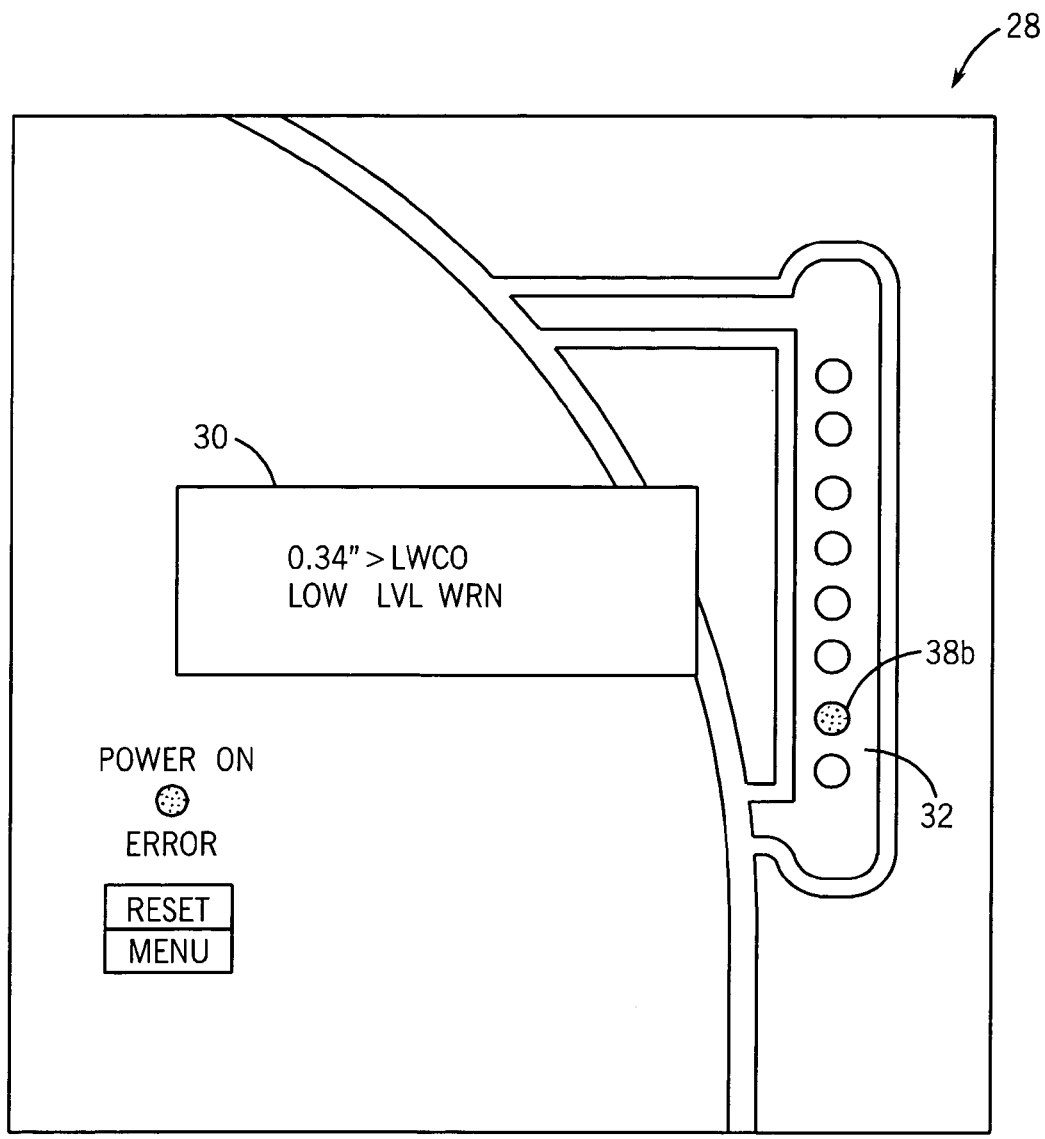
FIG. 10 is a diagram of a boiler controller data display and level indicator illustrating a low water warning in accordance with one aspect of the invention.

FIG. 10 is a diagram of a boiler controller data display 30 and level indicator 32 of controller 28 illustrating a low water warning. In this circumstance, if the water flow to the boiler is interrupted, and the water level in the boiler continues to drop to a certain point, a low level warning will be indicated. In the example shown, boiler controller data display 30 indicates a water level of 0.34 inches above the LWCO point, which is the predetermined level for the low level warning in this scenario. The message in the boiler controller data display 30 indicates a "LOW LVL WRN" accompanied by a low water warning indicating light. The low water warning is evidenced by the lighting of positional LED indicator 38b in level indicator 32 with a warning color, such as yellow.

Figure 11:
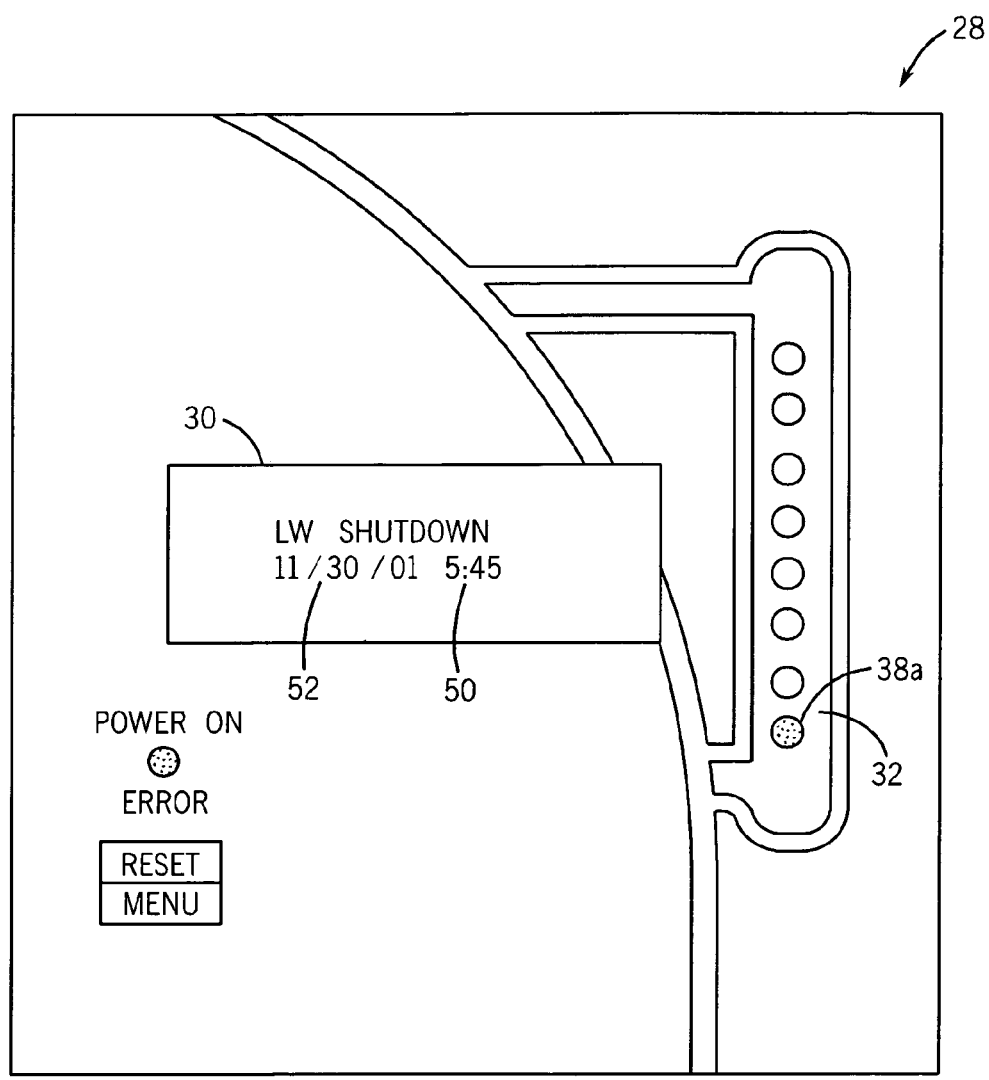
FIG. 11 is a diagram of a boiler controller data display and level indicator illustrating a low water shutdown indicator in accordance with one aspect of the invention.

FIG. 11 is a boiler controller data display 30 and level indicator 32 of controller 28 illustrating a low water shutdown. This action takes into account that an absence of water is one of the most serious occurrences in a boiler, and is to be avoided to prevent serious damage. If after the low water warning of FIG. 10 no corrective action is taken, an alarm may sound after a specified amount of time (such as, for example, for a period of five seconds). In this circumstance, if the proper water level to the boiler is not restored, a low water shutdown will occur. In the example shown, boiler controller data display 30 indicates "LW SHUTDOWN." The message in the boiler controller data display 30 also indicates the time 50 and date 52 of the low water shutdown and this information is logged into controller 28. The low water shutdown is accompanied by the lighting of positional LED indicator 38a in level indicator 32 with an alarm color, such as red. An alarm will sound so that corrective action may be taken. Also, because of the seriousness of the situation, the burner will actually be shut off to prevent damage to the boiler.

The action taken reflects the fact that an absence of water from an operating boiler can be disastrous and in reality is much more serious than the opposite problem of high water in the boiler. Therefore, as opposed to simply having an alarm go off, the measures taken are strong, i.e., shutting the system down. In general, the controller 28 will enter a low water alarm countdown period and then after that time period expires, the controller will enter a low water warning alarm condition followed by a low water cutoff countdown period and subsequent shutdown condition. All warning and alarm conditions are logged into the controller history. In one embodiment, the alarm conditions will remain on display 30 until the reset/menu button is depressed.

Testing and Diagnostics

Figure 12:
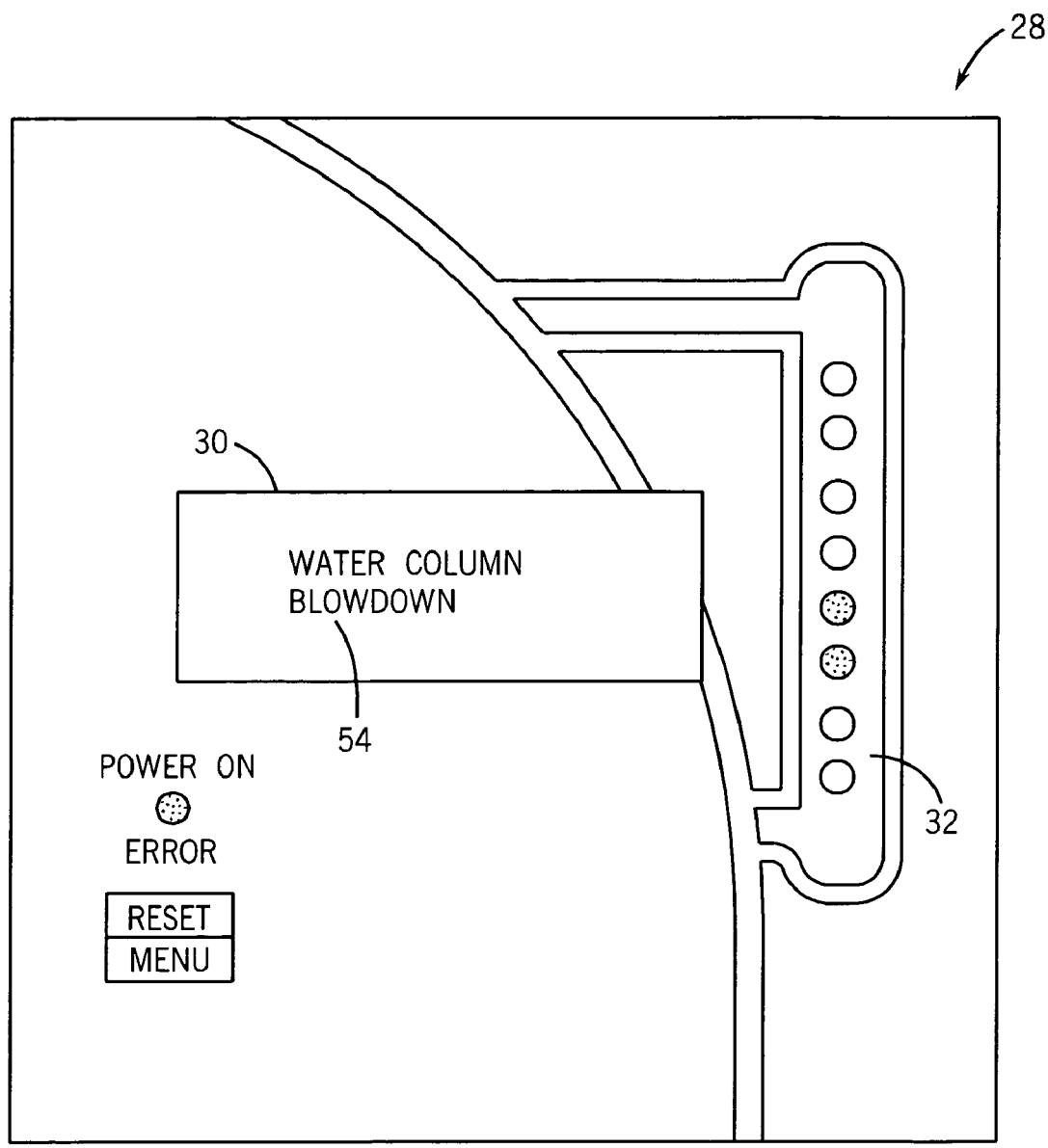
FIG. 12 is a diagram of a boiler controller data display and level indicator illustrating primary water column blowdown testing in accordance with one aspect of the invention.

FIG. 12 is a diagram of the boiler controller data display 30 and level indicator 32 of controller 28 illustrating one of the testing and diagnostic functions of the present invention, namely primary water column blowdown testing. The testing and diagnostics help to assure that the controller 28 is operating as designed and that the functionality of the water level sensor 12 (of FIG. 2) can be verified. The number and type of tests and diagnostics, also termed "self-check" features, can also vary and can include, among others: a float check where the float is monitored for sufficient movement (helpful in detecting a "stuck float" condition) and excessive movement; LWCO relay diagnostics that monitor upstream and downstream voltages on each side of LWCO relay to determine relay fail conditions such as inoperative relay, short relay and open relay conditions; an ALWCO check to test the functionality of the auxiliary low water cutoff water level controller; and a primary water column blowdown test. In the example shown, boiler controller data display 30 indicates the "WATER COLUMN BLOWDOWN" 54 test. In a preferred embodiment, the LWCO blowdown test is prompted by the controller 28 periodically. The controller 28 monitors the blowdown test progress and stores blowdown test results in a history file, from which the results can be retrieved either from the controller history file or a master history file that may be, for example, available on through a PC or other computer connection. The purpose for water column blowdown test 54 is to make sure the water level first goes more than one inch below the LWCO point, to simulate an emergency situation for which action would be required. After the water drops below the LWCO point, after a specified amount of time, the water level is then to rise back above the LWCO point.

Figure 13:
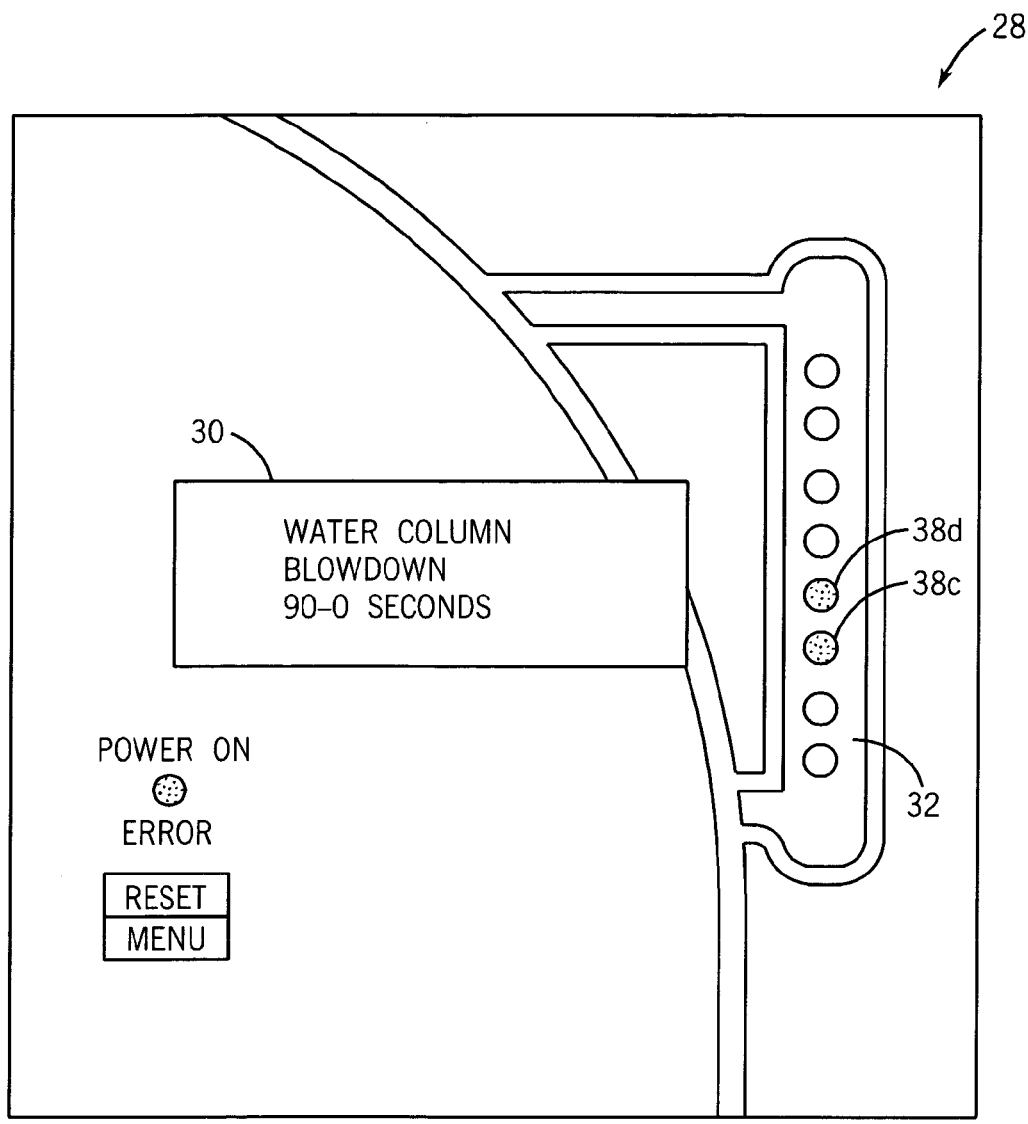
FIG. 13 is a diagram of a boiler controller data display and level indicator illustrating the timing of blowdown testing in accordance with one aspect of the invention.

FIG. 13 is a diagram of the boiler controller data display 30 and level indicator 32 of controller 28 illustrating the timing of blowdown testing. Generally, the test will be conducted within a specified amount of time. In the example shown, the time limit is 90 seconds, and boiler controller data display 30 indicates the "WATER COLUMN BLOWDOWN 90-0 SECONDS" reflecting a countdown of the timer from ninety to zero during which the test must be completed. The test begins with the water level in an acceptable normal level, as evidenced by the lighting of positional LED indicators 36c-d in level indicator 32 with a normal level color, such as green. If a blowdown test is not attempted after starting this sequence, following the 90 second time limit an alarm will sound and boiler controller data display 30 will indicate an "UNSUCCESSFUL BLOWDOWN" or similar message along with a time and date stamp. Once a blowdown cycle has been initiated, one feature includes a five minute or other wait period before another blowdown cycle can be initiated.

The float control shall be monitored for normal expected level variation due to steaming, except during initial startup when the boiler may be cold and when the boiler is off. Detecting voltage on the burner status input terminal activates this feature. Upon voltage detection boiler on timer (default value 1 Hr) is energized. If boiler is off (no voltage detected on the burner status input terminal) for more than 0.5 Hrs (subject to change) boiler on timer is reset to 0. Float check is activated after burner on timer times out. If the average level bounce in 5 minutes period is less than 0.05", LWCO relay is deenergized and failure message is displayed. Failure message has to be followed by a message to perform column blowdown. LWCO relay can be energized only after successful column blowdown. Level bounce is defined as a difference between lowest and highest water lever values taking in 15 seconds period (0-15 sec., 1-16 sec., 2-17 sec., etc.).

Figure 14:
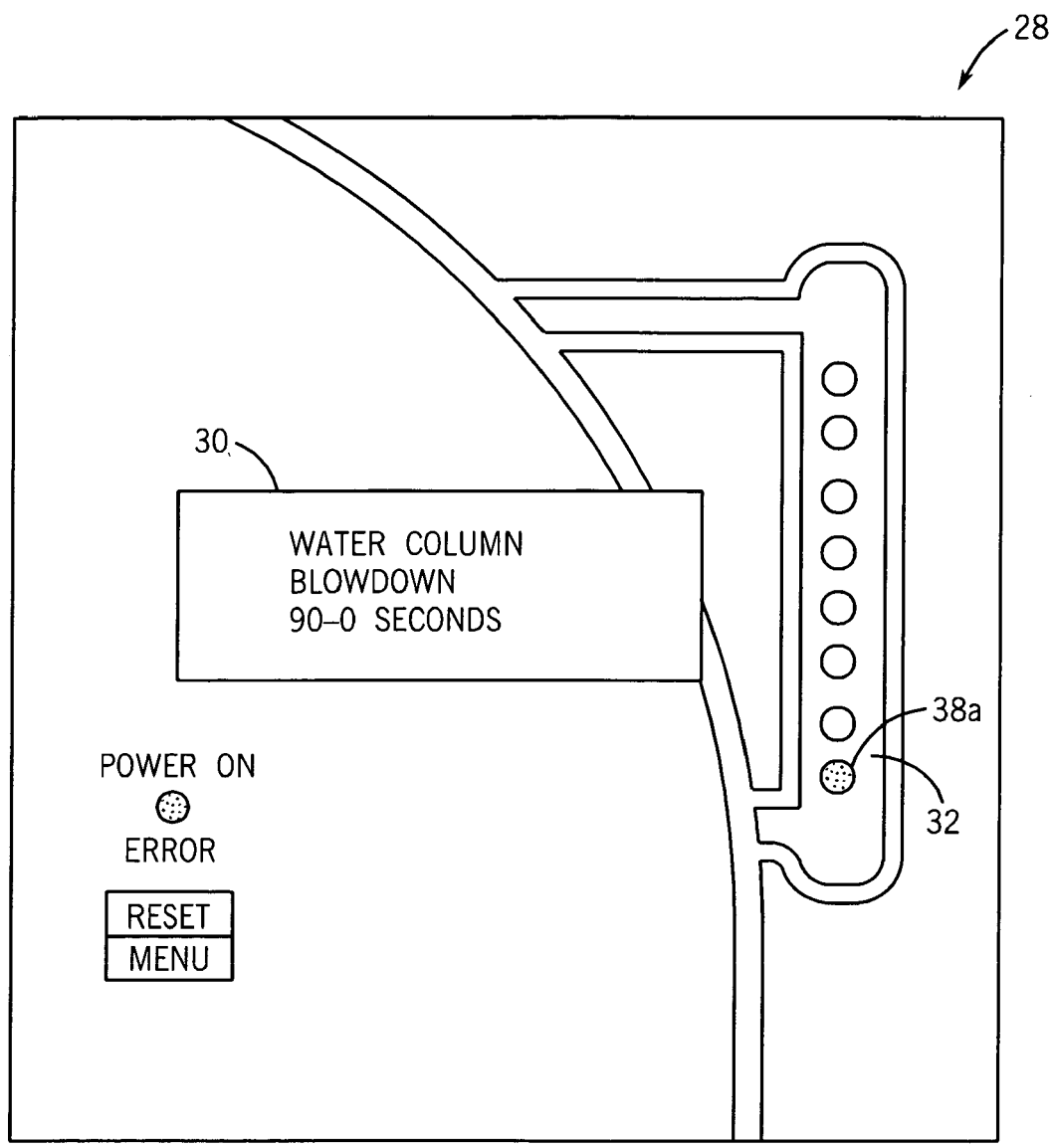
FIG. 14 is a diagram of a boiler controller data display and level indicator illustrating decreasing water level in the level sensor and pressure vessel as part of the blowdown cycle in one aspect of the invention.

FIG. 14 is a diagram of the boiler controller data display 30 and level indicator 32 of controller 28 illustrating the decreasing water level in the level sensor and pressure vessel as part of the blowdown cycle. During the blowdown cycle, the water level must go below the primary LWCO, in this case more than one inch below the LWCO point. The low water cutoff condition is accompanied by the lighting of positional LED indicator 38a in level indicator 32 with an alarm color, such as red. The test allows the water level to remain below the LWCO point for a given period (e.g., thirty seconds). If the water level is not raised above the LWCO point by the expiration of the period, the burner will shut down and the boiler controller data display 30 may display such messages as "LW SHUTDOWN" or similar message along with a time and date stamp and an alarm will sound.

Figure 15:
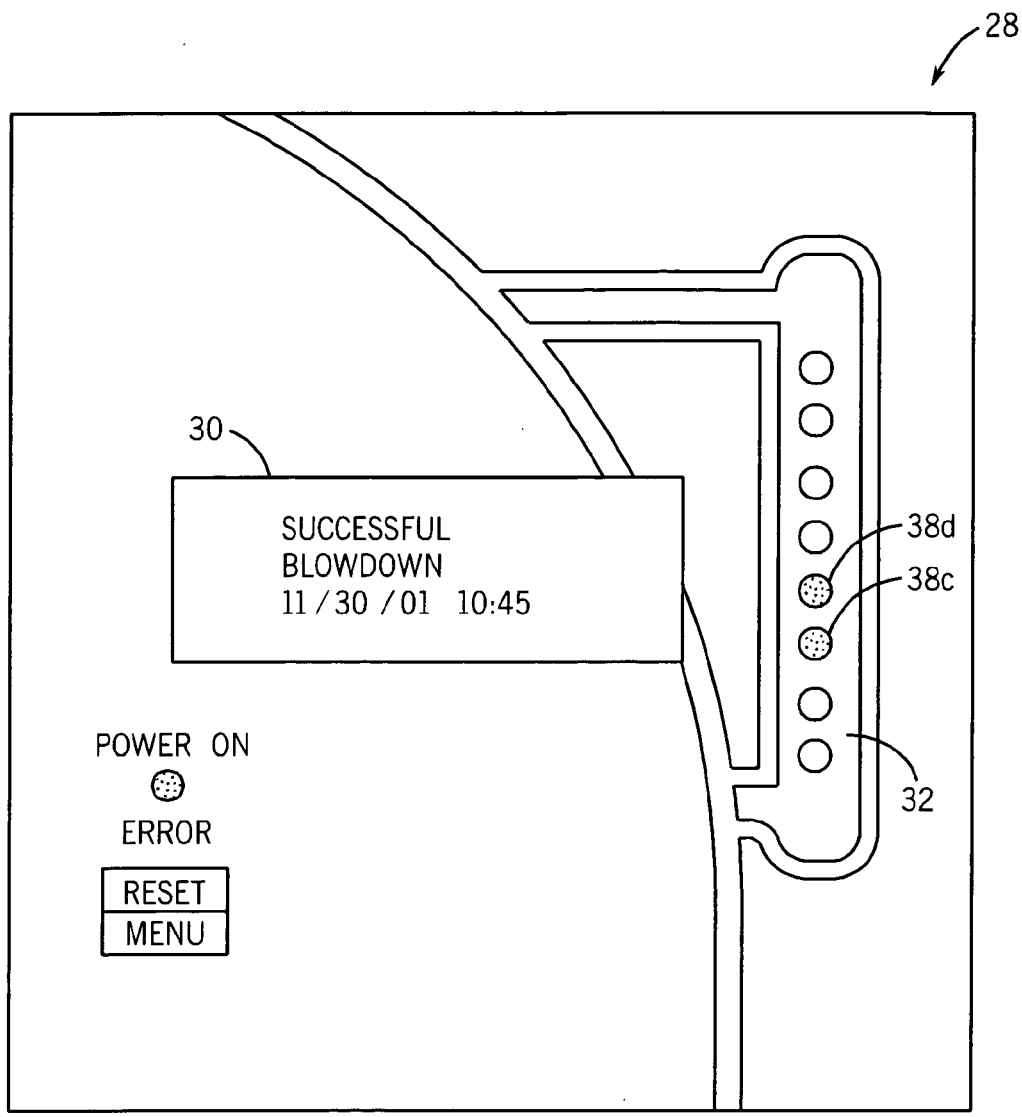
FIG. 15 is a diagram of a boiler controller data display and level indicator illustrating a successful blowdown cycle completed in accordance with one aspect of the invention.

FIG. 15 is a diagram of the boiler controller data display 30 and level indicator 32 of controller 28 illustrating a successful blowdown cycle. If during the test the water level is returned above the LWCO level to a normal operating range, as indicated by the lighting of positional LED indicators 38c-d in level indicator 32 with a normal operating range color, such as green, the blowdown test will be considered to be successful. This result is displayed in boiler controller data display 30 as "SUCCESSFUL BLOWDOWN" or similar message along with a time and date stamp.

Figure 16:
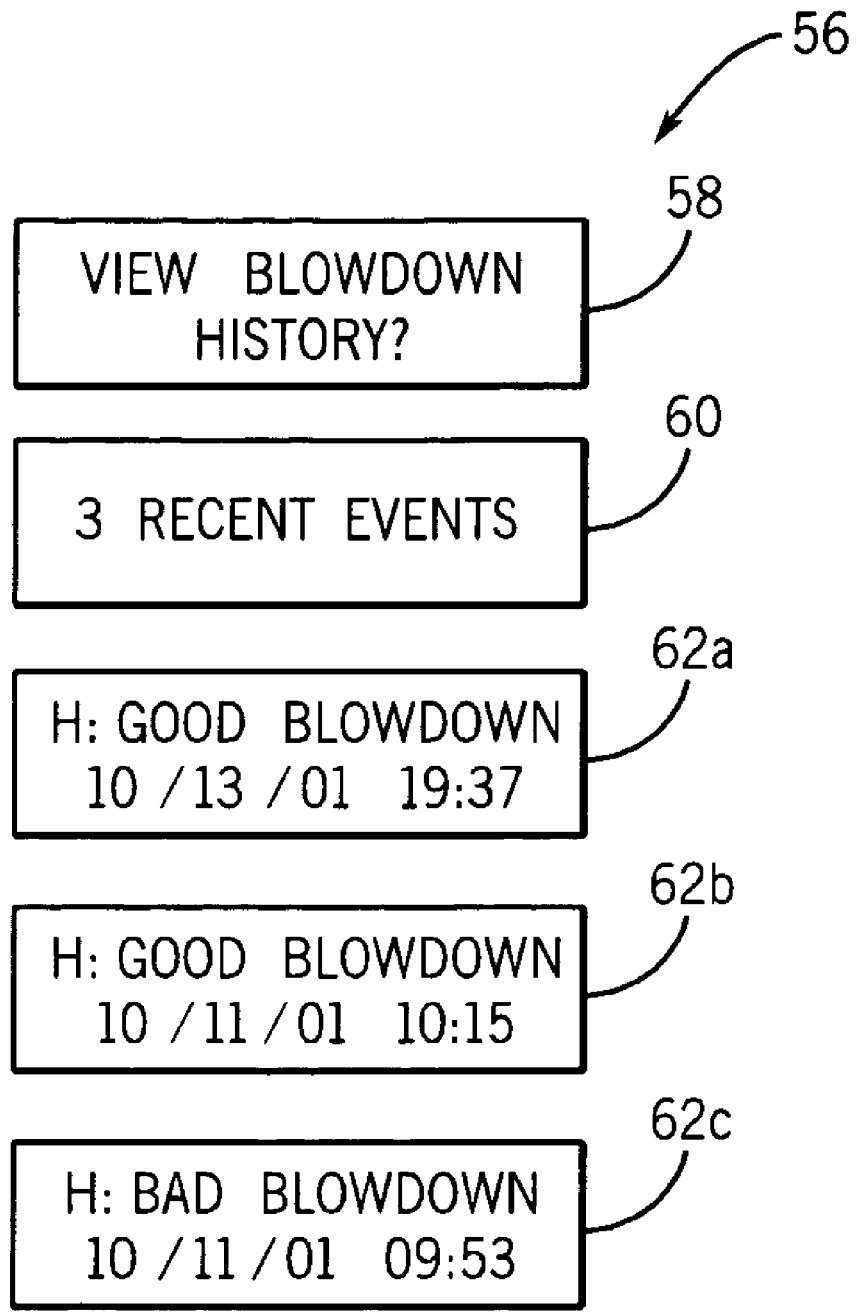
FIG. 16 is a chart illustrating exemplary history file blowdown test results stored in the boiler controller in accordance with one aspect of the invention.

FIG. 16 is a chart illustrating an exemplary blowdown test event history 56, which is stored in a history file for blowdown test results. This example shows a partial history for blowdown test results, but other types of information are available in the history file. Preferably, event history 56 is stored in both the boiler controller and displayed as part of a "last 20 blowdown history" file as well as a "last 500 history" file that is accessed through a PC or other computer connection. The number of events accessible may vary and will in part be dictated by processing power and the needs of the operator. Event history 56 may also include successful and failed test messages and the date and time stamps of particular blowdown activity. As shown in history query option 58, information is available by making a history request. Following the request, a informational screen indicates the number of requested history events 60 (three in the example shown), along with a listing of events 62a-c detailing additional information regarding the blowdown, including whether it was good or bad (i.e., successful or unsuccessful), as well as the time and date of events 62a-c.

Figure 17:
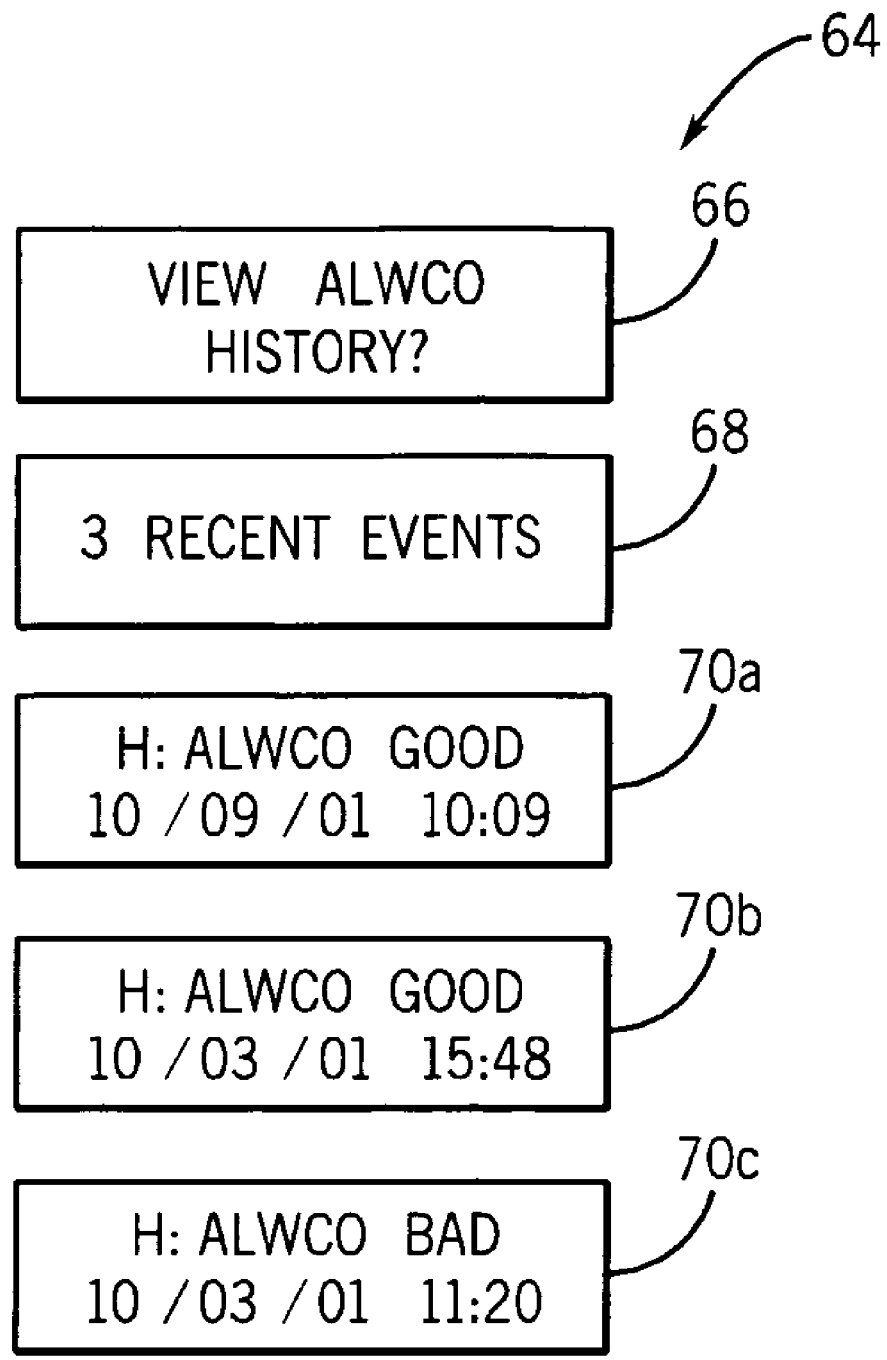
FIG. 17 is a chart illustrating exemplary auxiliary low water cutoff test history file results stored in the boiler controller in accordance with one aspect of the invention.

FIG. 17 is a chart illustrating an exemplary auxiliary low water cutoff test event history 64, which is stored in a history file for auxiliary low water cutoff test results. This example shows a partial history for auxiliary low water cutoff test results, but other types of information are available in the history file. Again, event history 64 may be stored in both the boiler controller and displayed as part of a "last 5 auxiliary low water cutoff test history" file as well as a "last 500 history" file that is accessed through a PC or other computer connection. The number of events accessible may vary and will in part be dictated by the processing and storage capacity of the system and the needs of the operator. Event history 64 may also include successful and failed test messages and the date and time stamps of particular auxiliary low water cutoff test activity. As shown in history query option 66, information is available by making a history request. Following the request, a informational screen indicates the number of requested history events 68 (three in the example shown), along with a listing of events 70a-c detailing additional information regarding the auxiliary low water cutoff tests, including whether each event was good or bad, as well as the time and date of events 70a-c. Events 70a-c, which include at least one of water level data and historical data, can be arranged chronologically, reverse chronologically with newest messages first, or be arranged such that they are at least one of time and date specific or "after mm/dd/yyyy" to set forth a specific time frame for viewing.

Figure 18:
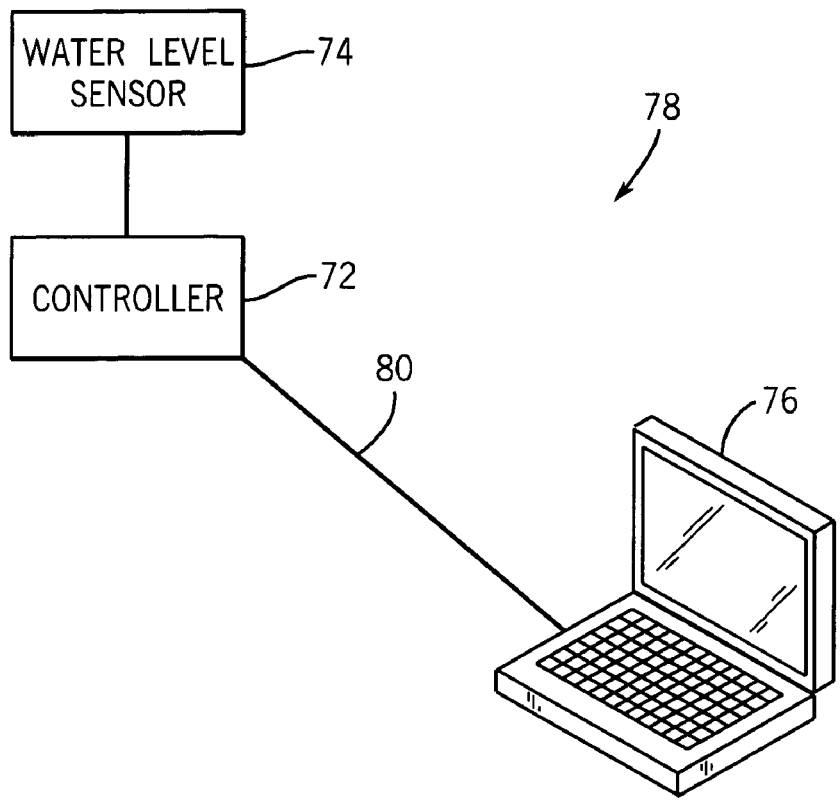
FIG. 18 is a schematic illustrating a PC diagnostic and testing connection to the boiler controller as part of the present invention.

FIG. 18 is a schematic illustrating a diagnostic and testing connection to a boiler controller 72. Together, the water level sensor 74, the controller 72 and an operator computer 76 form the basis of a computer implemented water level control system 78 for use with a steam boiler. The controller 72 is in communication with the level sensor 74 to obtain level sensor information from the water level sensor, to transmit system operating information and to relay test result information.

Computer 76 has a program or programming means stored in a memory, the program readable by the computer 76 to permit the computer 76 to access the controller and to generate, access and display at least one of water level and historical information to a user. In a preferred embodiment, the program is a terminal emulation program. Computer 76 is connected to the controller via a connection 80, which may be, among others, an RS 232 port connection, a wireless connection or an Internet connection via a global computer network. Computer 76 can be in close proximity (such as when a technician is at the site) or may access the controller from a remote location, depending on the connection 80 that is available and desired.

Figure 19:
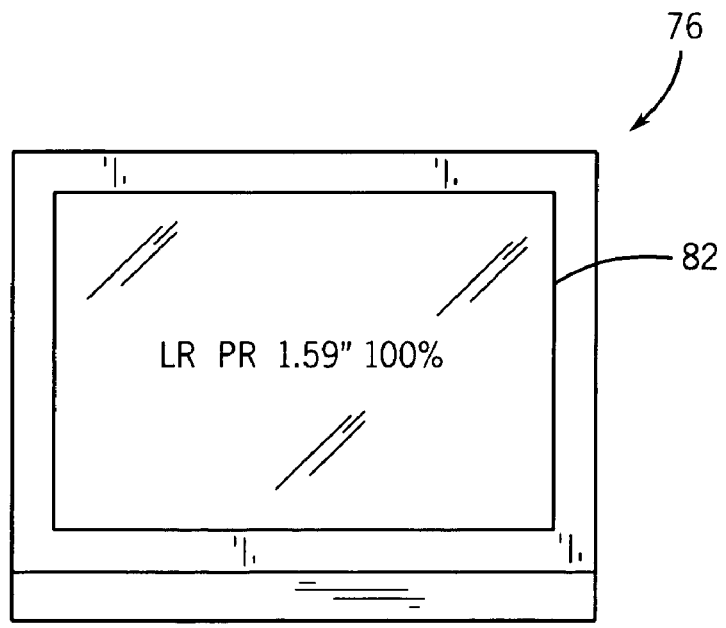
FIG. 19 is a schematic illustrating a computer screen as part of the connection of FIG. 18 with exemplary master history file data.

FIG. 19 is a schematic illustrating a computer screen 82 as part of the computer 76 of FIG. 18 with exemplary master history file data. In the example shown, current status information for the boiler is displayed in response to an operator inquiry, particularly LR PR 1.59" 100%. The data in this example indicates that the LWCO relay is energized (LR), the feedwater pump relay is on (PR), the current water level (in inches) and the current valve position % output (100%).

Figure 20:
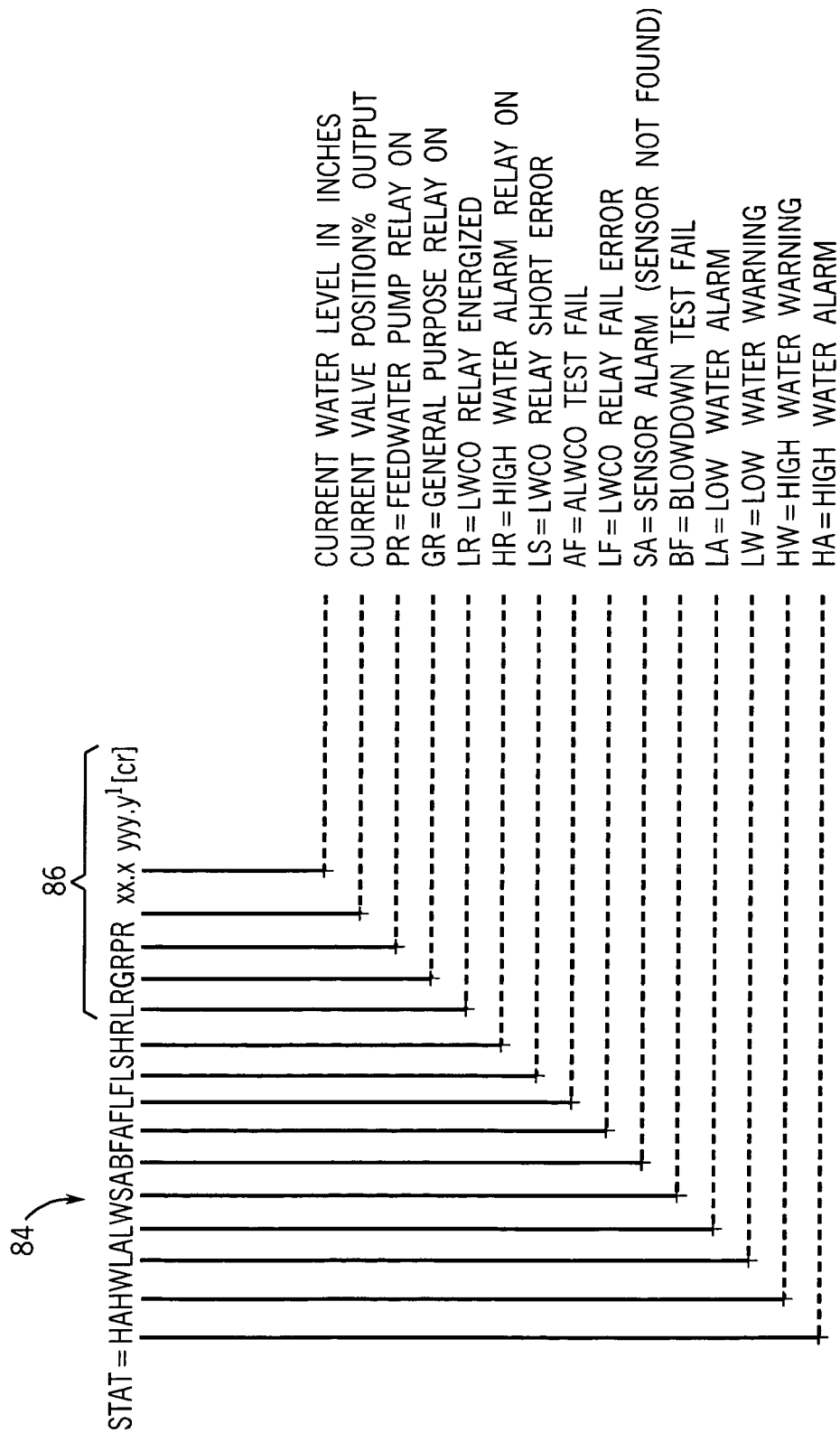
FIG. 20 is a representation of the controller status command variables as part of an operator status inquiry in accordance with one aspect of the invention.

FIG. 20 is a representation of exemplary controller status command variables as part of an operator status inquiry made from a computer connection or directly to the controller. In the current format, variables can appear in a string of variables 84, with some variables selected for a given status inquiry for the boiler and controller. In the example from FIG. 19, the four variables selected were from variable string section 86 of string 84, with the specific variables that were requested being returned in response to the status command. The definitions of other exemplary variables, the number of which are not limited to those variables shown, are included in the legend of FIG. 20, and may include at least one of high water alarms, high water warnings, low water shutdowns/alarms, low water warning, sensor errors, low water cut off relay failure alarms, low water cut off relay short alarms, successful auxiliary low water cut off tests, failed auxiliary low water cut off tests, successful blowdown tests, failed blowdown tests, slow float warnings, failed flow alarms, burner status check alarms, reset warnings, clock stopped warnings, clock failure alarms.

Other exemplary functionalities that are possible from computer 76 include: setting up the system features and options of the boiler water level control system from the computer; monitoring boiler water level status information using the computer; clearing at least a portion of the boiler water level control system information; determining a system status of at least one of alarms, warnings, water levels, relay conditions and modulating valve output of the boiler water level control system; troubleshooting the boiler water level control system from the computer based on the boiler water level control system information; and debugging the boiler water level control system from the computer based on the boiler water level control system information. Any necessary functionality that would be beneficial to conduct via an operator with a computer is contemplated.

Figure 21C:
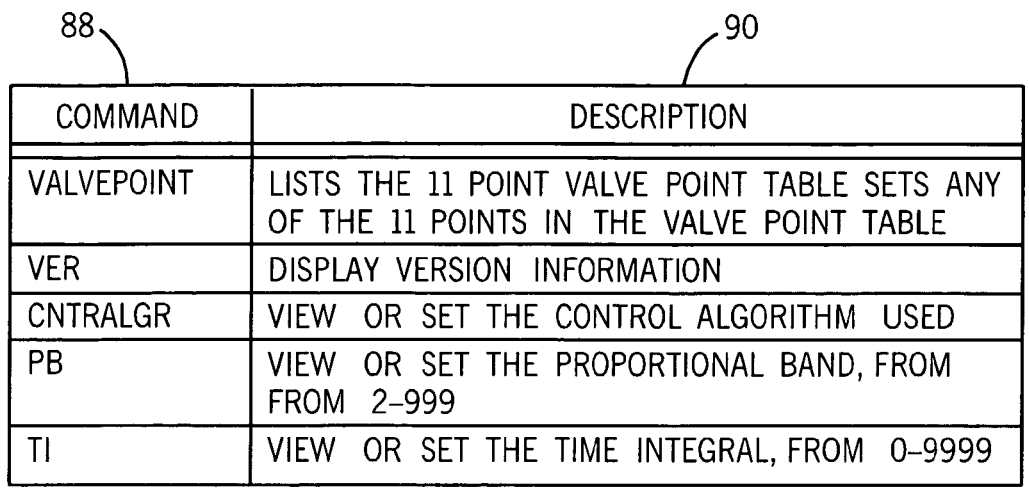

FIGS. 21A-C are charts illustrating exemplary operator commands 88 that are available as part of an operator inquiry of the boiler water level control system along with associated descriptions 90. The information available may be both historical level sensor information and operational/safety information. As one example, the STAT command 92 of FIG. 21B makes it possible to display the status information illustrated in FIGS. 19-20. The historical level sensor information may include at least one of alarm information, warning information, low water cut off blowdown information, and auxiliary low water cut off test histories. The operational/safety information may include at least one of: current time information, current date information, previous warning/alarm times information, low water cut off blowdown times information, auxiliary low water cut off test times information, and settings information. The settings information may include modulating valve open/close point values, valve operating speeds, and PID controls, pump on/off spans, water levels and other status information. Many other types of information and data are available and are considered to be within the scope of the invention.

A method of providing computerized access to boiler water level control system information is also disclosed. The method includes: providing a computer having a memory and a boiler water level control system controller having boiler water level control system information, the controller in communication with the computer, the computer programmed with a program to be stored in the memory for execution by the computer; and upon execution of the program, providing computerized access to the boiler water level control system information from the boiler water level control system controller.

While the present invention has been described in terms of the preferred embodiment, it is recognized that equivalents, alternatives, and modifications, aside from those expressly stated, are possible and within the scope of the appending claims. For example, the present water level control system may be used as a retrofit to existing boilers as well as integrated into new boiler production.

The invention claimed is:

1. In a system comprising a level sensor assembly, a computer having a memory and a boiler water level control system controller having historical boiler water level control system information, the controller in communication with the level sensor assembly and the computer, the computer programmed with a program to be stored in the memory for execution by the computer, and a float that is in operational association with the level sensor assembly, a method comprising:

providing, upon execution of the program, computerized access to the historical boiler water level control system information from the boiler water level control system controller; and utilizing the historical boiler water level control system information in at least one of testing, over a specified amount of time, and diagnosing at least one boiler water level control system functionality;

wherein the at least one boiler water level control system functionality includes a float check that includes monitoring the float to ensure that any movement of the float is sufficient for and within the specified period of time; and wherein the float check is in operable association with a burner, such that the float check is activated upon detecting voltage on a burner status input terminal of the burner.

2. The method of claim 1, wherein a boiler on timer is energized upon detection of the voltage, and the float check is activated upon the boiler on timer timing out.

3. In a system comprising a level sensor assembly, a computer having a memory and a boiler water level control system controller having historical boiler water level control system information, the controller in communication with the level sensor assembly and the computer, the computer programmed with a program to be stored in the memory for execution by the computer, and a float that is in operational association with the level sensor assembly, a method comprising:

providing, upon execution of the program, computerized access to the historical boiler water level control system information from the boiler water level control system controller; and utilizing the historical boiler water level control system information in at least one of testing, over a specified amount of time, and diagnosing at least one boiler water level control system functionality;

wherein the at least one boiler water level control system functionality includes a float check that includes monitoring the float to ensure that any movement of the float is sufficient for and within the specified period of time; and wherein monitoring the float to ensure any movement of the float is sufficient for and within the specified period of time includes deenergizing a low water cut off (LWCO) relay if a level bounce of the float in a period of at least a plurality of minutes is less than an inch.

4. The method of claim 3, wherein the level bounce of the float in a five minute period is less than 0.05".

* * * * *